United States Patent
Alsop et al.

(10) Patent No.: US 11,526,449 B2
(45) Date of Patent: Dec. 13, 2022

(54) LIMITED PROPAGATION OF UNNECESSARY MEMORY UPDATES

(71) Applicant: ADVANCED MICRO DEVICES, INC., Santa Clara, CA (US)

(72) Inventors: Johnathan Alsop, Bellevue, WA (US); Pouya Fotouhi, Santa Clara, CA (US); Bradford Beckmann, Bellevue, WA (US); Sergey Blagodurov, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/007,133

(22) Filed: Aug. 31, 2020

(65) Prior Publication Data
US 2022/0066940 A1 Mar. 3, 2022

(51) Int. Cl.
*G06F 12/08* (2016.01)
*G06F 12/0891* (2016.01)
*G06F 9/30* (2018.01)
*G06F 12/0882* (2016.01)
*G06F 12/0811* (2016.01)

(52) U.S. Cl.
CPC ...... *G06F 12/0891* (2013.01); *G06F 9/30047* (2013.01); *G06F 12/0811* (2013.01); *G06F 12/0882* (2013.01)

(58) Field of Classification Search
CPC .............. G06F 12/0811; G06F 12/0891; G06F 9/30047; G06F 12/0882
USPC ........................................................ 711/154
See application file for complete search history.

(56) References Cited

U.S. PATENT DOCUMENTS

| | | | | |
|---|---|---|---|---|
| 2008/0104329 | A1* | 5/2008 | Gaither | G06F 12/0888 711/138 |
| 2017/0017476 | A1* | 1/2017 | Ebcioglu | G06F 12/0895 |
| 2018/0165214 | A1* | 6/2018 | Farmahini Farahani | G06F 12/0888 |
| 2018/0232311 | A1* | 8/2018 | Bhati | G06F 12/0897 |

OTHER PUBLICATIONS

Banakar, Rajeshwari, et al., "Scratchpad Memory: A Design Alternative for Cache On-chip Memory in Embedded Systems." International Symposium on Hardware/Software Codesign, May 6-8, 2002, 6 pages.
Hower, Derek R., et al., "Heterogeneous-Race-Free Memory Models." Proceedings of the 19th International Conference on Architectural Support for Programming Languages and Operating Systems, Feb. 2014, 14 pages.
Gaster, Benedict R., et al., "HRF-Relaxed: Adapting HRF to the Complexities of Industrial Heterogeneous Memory Models." ACM Transactions on Architecture and Code Optimization, vol. 12, No. 1, Article 7, Apr. 2015, 26 pages.

* cited by examiner

Primary Examiner — Hua J Song

(57) ABSTRACT

A processing system limits the propagation of unnecessary memory updates by bypassing writing back dirty cache lines to other levels of a memory hierarchy in response to receiving an indication from software executing at a processor of the processing system that the value of the dirty cache line is dead (i.e., will not be read again or will not be read until after it has been overwritten). In response to receiving an indication from software that data is dead, a cache controller prevents propagation of the dead data to other levels of memory in response to eviction of the dead data or flushing of the cache at which the dead data is stored.

20 Claims, 6 Drawing Sheets

LIMITED PROPAGATION OF UNNECESSARY MEMORY UPDATES

BACKGROUND

To support execution of instructions, a processing system typically includes a memory subsystem having memory modules to store data to be accessed by the executing instructions. The memory subsystem can be organized into a memory hierarchy having main memory at the top of the hierarchy to store a larger quantity of data that can be accessed by the executing instructions, and one or more caches at lower levels of the memory hierarchy to store subsets of the data stored at main memory. For example, a processing system includes a processor and a memory hierarchy having two caches, a lower level cache (closer to main memory in the memory hierarchy) and a higher level cache (closer to a processor core of the processing system).

Data to be cached in the memory hierarchy is typically manipulated as blocks of data referred to as "cache lines", and which are addressed or otherwise located in a memory hierarchy using a physical address of the main memory. Because a cache tends to be of limited size relative to main memory, a cache controller for the cache implements a replacement policy wherein, in response to receiving a new cache line, the controller identifies if there is room available in the cache to store the new cache line and, if not, selects a cache line already stored in the cache for eviction. If the cache line selected for eviction has been modified by the processor (referred to as a "dirty" cache line), the cache controller writes the cache line back to main memory or one or more lower-level caches. Evictions, therefore, consume memory bandwidth, which can negatively impact processing efficiency in certain scenarios.

Further, it is often advantageous to deactivate, or "power down", caches when not in use. To deactivate a cache, the cache is flushed and any valid cache lines are sent to main memory. However, writing back dirty cache lines to main memory or one or more lower-level caches consumes memory bandwidth and increases latency.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
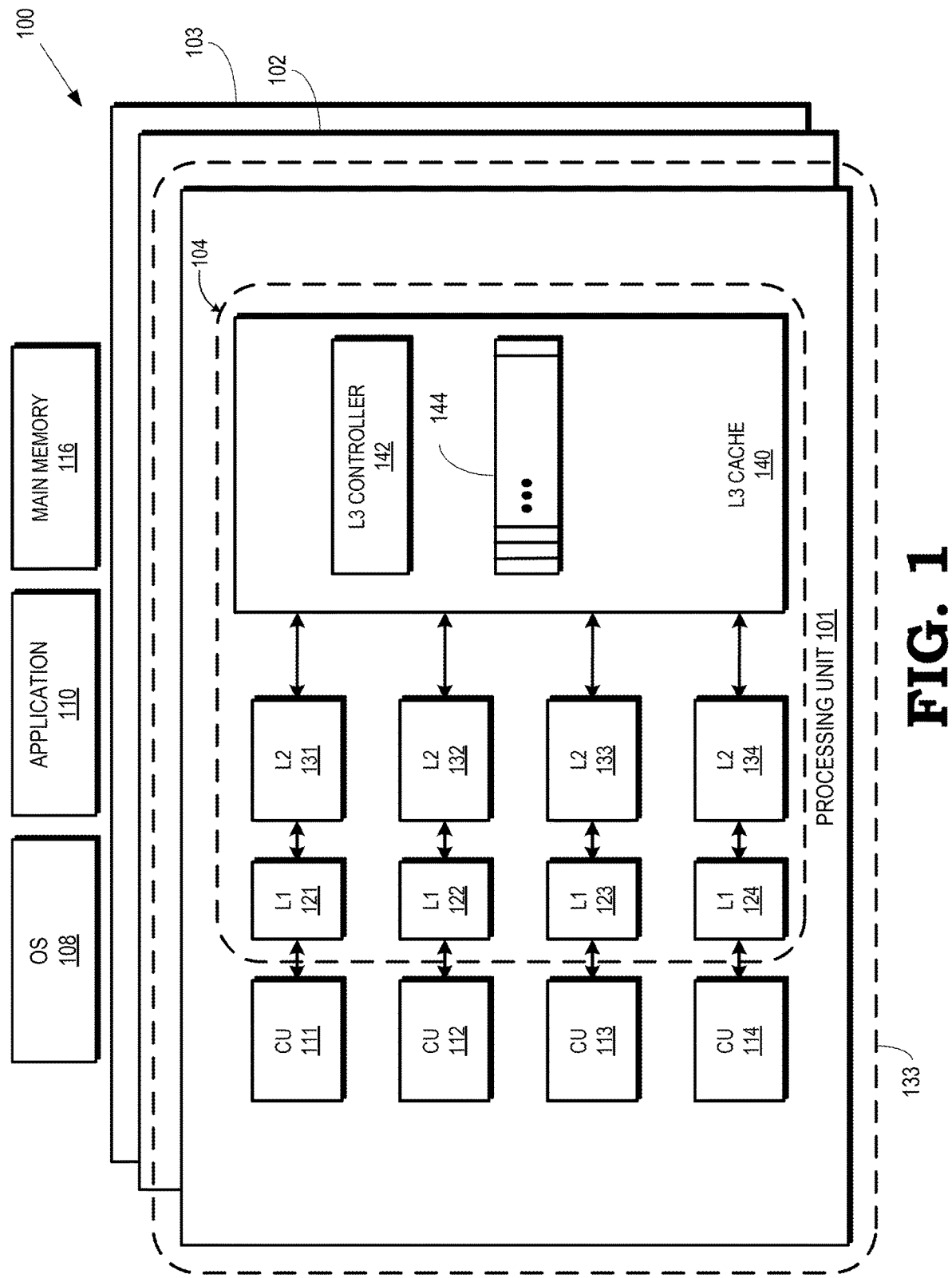
FIG. 1 is a block diagram of a processing system for limiting propagation of unnecessary memory updates in accordance with some embodiments.

Keeping multiple processing devices and their associated caches coherent in a large-scale processing system incurs latency costs, even for data that is never read again, or that is read by a limited subset of processing devices. Writing back dirty cache lines in response to evictions or cache flushes consume significant bandwidth as a processing system scales. Further, machine intelligence (MI) and high-performance computing (HPC) workloads tend to exhibit high write demand, frequent synchronization, and limited inter-device communication. For example, MI workloads often use fine-grain modular kernels to execute a network of layers that produce and consume new data at every iteration. Writing back data that has already been consumed and that will not need to be read again to the rest of a coherent memory hierarchy is unnecessary and contributes to network congestion and latency. As systems scale larger, the mechanisms required to keep many devices coherent in a system can incur significant bandwidth and latency costs for propagating data updates, even if the data is never read again or is only read again by a limited set of devices. For example, in some MI and HPC workloads, propagation of memory updates accounts for over 20% of graphics processing unit (GPU) execution time. The latency is attributable to traversing lower-level caches for dirty cache lines, probing remote caches such as central processing unit (CPU) caches that may contain copies of the dirty cache lines, and requesting memory accesses to main memory.

In some instances, the propagation of memory updates is not beneficial to workload execution because the updated data is not used again. For example, in some cases a workload writes (produces) data to shared memory, and the data is consumed by another workload without being read again by any other device in the processing system until the data is overwritten. If the producer of the data and the consumer of the data share a cache, they can fulfill the data exchange without the need to propagate changes to the data to main memory or other levels of caches. MI and HPC applications are often programmed using high-level languages that have explicit knowledge of producer-consumer relationships among processing devices. Thus, the software infers the location(s) at which produced data will be consumed or infers that the produced data will not be read again before it is next written. By communicating from software to hardware of a memory hierarchy of the system an indication that a cache block contains dead data and does not require further propagation, the system avoids unnecessary propagation of local writes.

FIGS. 1-7 illustrate techniques for limiting the propagation of unnecessary memory updates by selectively bypassing writing back dirty cache lines to other levels of a memory hierarchy in response to receiving an indication that the value of the dirty cache line will not be read again before it is overwritten. Such data is referred to herein as "dead" data. Software executing at the processing system generates "dead data operations" that semantically identify that the value or values of data stored at a region of memory are dead, either because the data has been read for the last time by a given workload or because the data will be overwritten before it is read again. In some embodiments, a dead data operation is a specialized load operation referred to as a "last load" operation, indicating that this is the last load before being overwritten and the target data can be considered dead after the load response. In other embodiments, a dead data operation is in the form of a request to classify particular data as dead until it is written again (referred to as a "mark as dead" operation). A dead data operation may target data at the granularity of a single byte/word/cache line (fine-grain), or it may specify a range of addresses to be considered dead (coarse-grain). In response to receiving an indication from software that a value of data is dead, a cache controller prevents propagation of the data to other levels of memory or remote coherent caches in response to eviction of the dead data or flushing of the cache at which the dead data is stored.

In some embodiments, address ranges of dead data are tracked at the cache where avoiding dirty writebacks is likely to be most beneficial. In some embodiments, address ranges of dead data are tracked at the cache controller for the last level cache (LLC), and in other embodiments, address ranges of dead data are tracked at, for example, a write combining GPU L2. A dead ranges buffer may be used for this purpose, updating to add new addresses to the dead ranges buffer in response to receiving a dead data operation and removing addresses that match incoming store operations that make data live again. In response to a request to perform a write-back operation, such as a write-back operation triggered by a flush operation or eviction of a dirty cache line or block of data, the cache controller for the LLC performs a range check to determine whether the address of the dirty cache line or addresses for the block of data fall within an address range of dead data maintained at the dead ranges buffer. If the address falls within an address range of dead data, the cache controller ignores the request to perform the write-back operation, bypassing writing back the dirty cache line to other levels of memory.

In some embodiments, when handling a dead data operation that data at the target address or address range is dead or that this is the last read operation for the target data, the memory system propagates the request through the device cache hierarchy and clears the dirty bit of any block of data found at the target address or address range. Once the dirty bit is cleared, the data will not be written back to other levels of memory in the cache hierarchy in response to being evicted or the cache in which the data is stored being flushed.

FIG. 1 illustrates a processing system 100 for limiting propagation of unnecessary memory updates in accordance with some embodiments. In the depicted example, the processing system 100 includes one or more processing units 101, 102, 103, which are collectively referred to herein as "the processing units 101-103." In some embodiments, the processing units 101-103 are central processing units (CPUs), graphics processing units (GPUs), accelerated processing units (APUs), application-specific integrated circuits (ASICs), field-programmable gate arrays (FPGAs), and the like. The processing system 100 can include more or fewer processing units 101-103. The processing system 100 also includes a memory 116 that can be accessed by the processing units 101-103. The memory 116 is used to store instructions for execution by the processing units 101-103, data to be used when executing instructions, or data representing the results of the executed instructions. The processing system 100 is generally configured to execute sets of operations organized in the form of computer programs in order to carry out tasks on behalf of an electronic device. Accordingly, the processing system 100 may be used in any of a variety of electronic devices, such as a desktop or laptop computer, server, smartphone, tablet, game console, and the like.

As illustrated in FIG. 1, the processing system also includes an operating system 108 and one or more applications 110. In some embodiments, the one or more applications 110 include various programs or commands to perform computations that are executed at the processing units 101-103. Components of the processing system 100 may be implemented as hardware, firmware, software, or any combination thereof. In some embodiments, the processing system 100 includes one or more software, hardware, and firmware components in addition to or different from those shown in FIG. 1.

The processing unit 101 includes compute units 111, 112, 113, 114 that are collectively referred to herein as "the compute units 111-114." Although not shown in FIG. 1 in the interest of clarity, the processing units 102, 103 also include compute units that operate in substantially the same manner as the compute units 111-114. The compute units 111-114 are configured to execute groups of instructions (known as work-groups) concurrently or in parallel. The processing unit includes one or more instruction pipelines to execute instructions, organized in the form of computer programs, thereby carrying out tasks on behalf of an electronic device. While each compute unit 111-114 may have some amount of integral memory, for example, in the form of registers, such memory is typically limited in storage capacity. Accordingly, in order to execute instructions, the compute units 111-114 store and retrieve data from the memory hierarchy of the processing system 100. As noted above, the memory hierarchy includes the cache hierarchy 104 that composes the lower levels of the memory hierarchy, and main memory 116 that resides at the top of the memory hierarchy and typically stores all or a relatively large portion of data that is expected to be accessed by programs executing at the processing units 101-103.

Cache lines are accessed from the system memory 116 by a memory controller (not shown) in response to memory requests from the cache hierarchy 104. Likewise, when a cache line containing modified data is evicted from the cache hierarchy 104 and thus needs to be updated in the system memory 116, the memory controller manages this write-back process.

The cache hierarchy 104 includes two or more levels of caches. In the illustrated example, the cache hierarchy 104 includes three cache levels: level 1 (L1), level 2 (L2), and level 3 (L3). For L1, the processing unit 101 implements small private caches for each compute unit 111-114, which are depicted as L1 caches 121, 122, 123, 124, each associated with a corresponding one of compute units 111, 112, 113, 114. The processing unit 101 implements larger private caches for each compute unit 111-114, which are depicted as L2 caches 131, 132, 133, 134 corresponding to compute units 111, 112, 113, 114, respectively. Each of the L2 caches 131-134 is private to its corresponding compute unit, but the cache hierarchy 104 operates to maintain coherency between the L2 caches 131-134. For the L3 caching level, the cache hierarchy 104 implements an L3 cache 140 that is shared by the compute units of the processing unit 101, and thus shared by at least the L2 caches 131-134.

In some embodiments, the processing system 100 employs a non-uniform memory access (NUMA) architecture, whereby the one or more caches and main memory are composed of memory modules having different memory architectures. Thus, in the depicted example, one or more of the caches of the cache hierarchy 104 are composed of fast memory, such as dynamic random access memory (DRAM), and main memory 116 is composed of slow memory, such as non-volatile memory. The NUMA architecture supports more flexible and robust data storage at main memory while maintaining processing efficiency. It will be appreciated that the techniques described herein can be applied to other processing systems having different memory architectures.

To access the memory hierarchy of the processing system 100, the compute units 111-114 generate operations, referred to as memory access requests, to store data (a write operation) to or load data (a read operation) from the memory hierarchy, and provide the memory access requests to a cache controller, such as L3 cache controller 142, for processing. As described further herein, the cache controller 142 works together with the one or more modules of cache of the cache hierarchy 104, the memory controller, and main memory 116 to satisfy the memory access requests. Although for purposes of illustration two private cache modules for each compute unit, one shared cache module, and one module of main memory are depicted in FIG. 1, it will be appreciated that the processing system 100 may include more or fewer modules of cache and main memory and may use any memory technology.

Each of the L1 caches 121-124 and L2 caches 131-134 is a memory module that stores data for access by the associated compute unit 111-114. In at least one embodiment, each L1 cache 121-124 and L2 cache 131-134 is composed of a set of entries, each of which can store an associated cache line. In some embodiments, the L1 caches 121-124 and L2 caches 131-134 are set-associative caches, wherein each cache is divided into a number of sets. Each set includes a number of ways, with each way corresponding to a cache entry that can store a cache line. Each set only stores a cache line associated with a subset of memory addresses, wherein the subset associated with a set is identified by the cache controller 142 based on a portion of the memory address referred to as the index. By employing set associativity, the L1 caches 121-124 and L2 caches 131-134 facilitate relatively quick identification of cache misses and cache hits.

Each cache of the L1 caches 121-124 and L2 caches 131-134 is associated with a cache controller which receives memory access requests for data from the compute units 111-114 and reads and writes data to memory. For ease of illustration, only the L3 cache controller 142 is depicted in FIG. 1. In the case of a read operation, the cache controller provides the requested cache line from the cache to the compute unit 111-114. In the case of a write operation, the cache controller stores the write data to the cache entry of the cache.

The L1 caches 121-124 and the L2 caches 131-134 are configured as a cache hierarchy. Each of the L1 caches 121-124, L2 caches 131-134, and the L3 cache 140 is sized such that it typically is unable to store, at a given point in time, all the data that is requested, or may be requested, by the corresponding compute unit 111-114, thereby requiring data to be transferred through the memory hierarchy as described above. To ensure data coherency and efficient transfer of data through the memory hierarchy, each of the cache controller associated with each L1 cache 121-124 and L2 cache 131-134 and the L3 cache controller 142 implements a replacement policy to identify if there is an entry in a set available to store a received cache line and, if not, to select one of the entries in the set for replacement.

To replace a valid cache line at an entry with an incoming cache line, the cache controller for a cache first evicts the valid cache line by transferring it to one or more other levels of the memory hierarchy and then stores the incoming cache line at the entry. To maintain memory coherency, in the event the cache line that is selected pursuant to the replacement policy is in a modified state (i.e., is "dirty"), the cache line is written back to main memory 116 and to any other cache 121-124, 131-134, 140 that stores the cache line upon eviction from the cache 121-124, 131-134, 140.

In some embodiments, to limit unnecessary write backs of dirty data that will not be read again, the L3 cache controller 142 maintains a dead ranges buffer 144 to track data identified as "dead" by software executing as an application 116. The application 110 generates dead data operations that identify that the values of data stored at a region of memory are dead. In some embodiments, an indication that the value or values of data is dead is included in metadata associated with an operation. For example, Dataflow programming languages such as TensorFlow®, Caffe, Theano, and Spark provide programmers with knowledge of producer-consumer relationships between compute units 111-114 and between processing units 101, 102, and 103 such that a programmer can indicate that some target data is dead. For example, in some embodiments the application 110 is programmed to generate a dead data operation to indicate that the target data to be stored has been read for the last time or that the data will be overwritten before it is next read. In some embodiments, if a programmer or compiler knows that a given address range is dead, the programmer or compiler generates a "target data is dead" operation specifying the target address or range of addresses in the metadata of the operation. Similarly, a programmer or compiler generates a "last read" operation by using a separate opcode or extra bit of metadata in the read operation (in addition to the target address or range of addresses that are already used by a load operation) to indicate that the data can be marked as dead following the read. In response to receiving an indication from the application 110 that the value of the target data is dead, the L3 cache controller 142 prevents propagation of the target data to other levels of the memory hierarchy in response to eviction of the dead data or flushing of the L3 cache.

In some embodiments, the L3 cache controller 142 tracks address ranges of dead data at the dead ranges buffer 144. The L3 cache controller 142 updates the dead ranges buffer 144 in response to receiving a dead data operation, adding the target range to the dead ranges buffer 144 (or potentially merging with an existing entry if they are contiguous). In response to receiving a request for a store operation for live data (i.e., a standard store operation that makes the target data live), the L3 cache controller 142 checks the dead ranges buffer 144 to determine if the address of the data that is the subject of the store operation matches an address or address range stored at the dead ranges buffer 144. If the address matches an address or address range stored at the dead ranges buffer 144, the L3 cache controller 142 updates the dead ranges buffer 144 to remove the matching address to prevent the newly stored live data from being discarded.

In response to a request to perform a write-back operation, such as a write-back operation triggered by a flush operation or eviction of a dirty cache line or block of data, the L3 cache controller 142 performs a range check to determine whether the address of the dirty cache line or addresses for the block of data fall within an address range of dead data maintained at the dead ranges buffer 144. If the address falls within an address range of dead data, the L3 cache controller 142 ignores the request to perform the write-back operation and bypasses writing back the dirty cache line to other levels of the memory hierarchy, reducing write congestion and latency.

In some embodiments, instead of (or in addition to) a dead range buffer, the memory system handles dead data operations by modifying the state of the targeted dirty data in the cache hierarchy. For example, for a deep neural network (DNN) workload that executes two successive write-intensive layers such as an activation layer and a subsequent convolutional layer, on the same processing unit 101 such that the two layers share a local cache, after the produced data has been consumed and will not be consumed again until after it has been written again, propagation of the produced data to lower cache levels (131, 140), to remote caches (122-124, 132-134), or to memory (116) would consume network bandwidth and add unnecessary latency to the completion of system-scope synchronization. The programmer can infer that the produced data will not be read before it is written again based on the high-level structure of the workload algorithm and can program a fine-grain or coarse-grain "last read" load operation or a "mark as dead" operation at the consumer kernel, both of which have the effect of marking the data as dead. To prevent unnecessary propagation of the produced data, these operations may be sent through the cache hierarchy, marking target data as dead in each cache they encounter. When a cache receives a dead data operation, it looks up the state of target data. If the state of the target data is modified/dirty, then the state is updated to the analogous non-dirty state according to the coherence protocol (e.g., M→E for MESI, DirtyValid→Valid for GPU coherence). If the state is not dirty, then the dead-data operation may be propagated to the next cache level in case it is dirty there. Dead data requests may be propagated down to a set cache level (below which minimal benefits are expected for avoiding dirty data propagation) or until the LLC is reached, after which they may simply be dropped.

Figure 2:
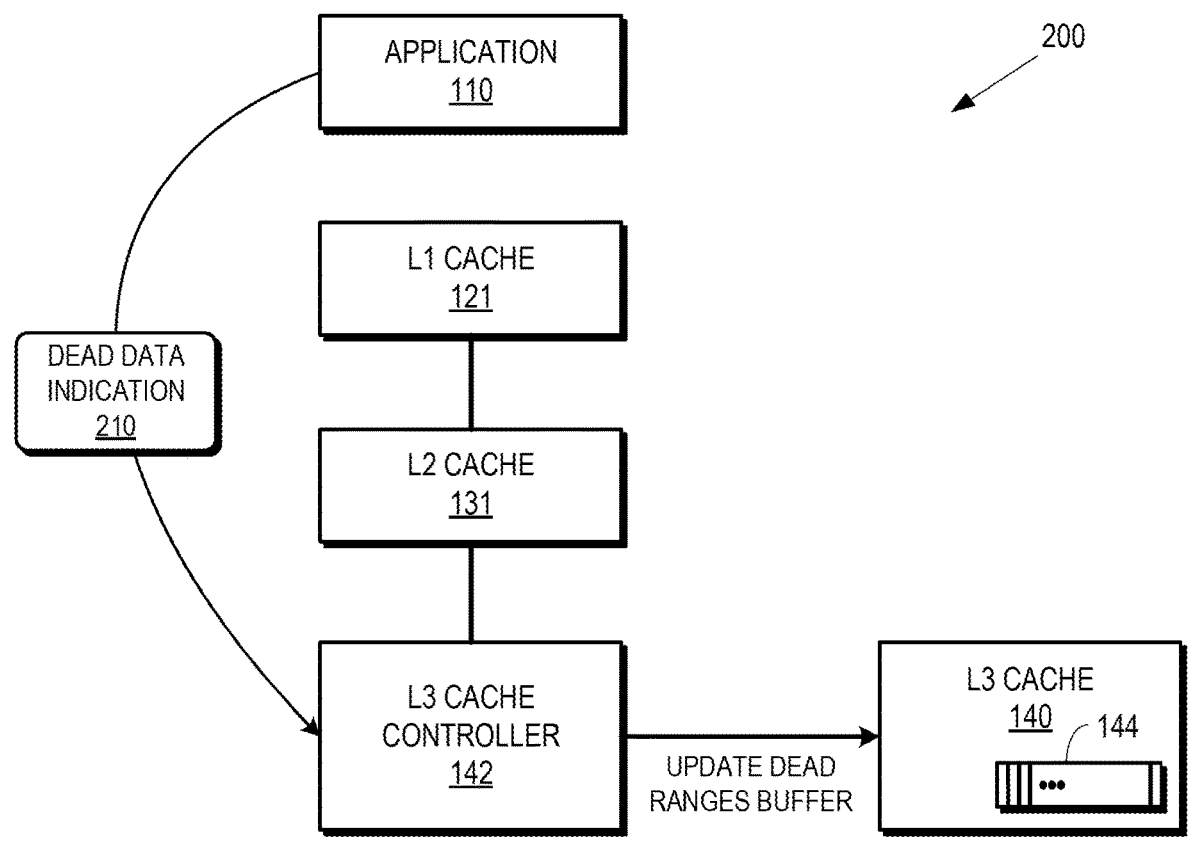
FIG. 2 is a block diagram of a cache controller updating a dead ranges buffer based on a dead store or last read instruction in accordance with some embodiments.

FIG. 2 is a block diagram of a portion 200 of the processing system 100 of FIG. 1 illustrating the L3 cache controller 142 updating the dead ranges buffer 144 based on receiving an indication of dead data and clearing a dirty bit for dead cache lines in accordance with some embodiments. In the illustrated example, the application 110 executing at the processing system 100 issues an operation including a dead data indication 210 (also referred to as a dead data operation) that indicates that the values of the region of data identified by the dead data operation has been read for the last time, or that the data will be overwritten before it is next read.

In response to receiving the dead data indication 210, the L3 cache controller 142 updates the dead ranges buffer 244 maintained at the L3 cache 140 by adding the address or address range of the data targeted by the operation. In some embodiments, in response to a subsequent eviction of the data targeted by the operation or in response to a flush of a cache at which the data targeted by the operation is stored, the L3 cache controller 142 bypasses writing back the data to other levels of the memory hierarchy in response to the address of the data matching an address or address range of the dead ranges buffer 144.

In some embodiments, in response to receiving the dead data indication 210, the L3 cache controller clears the dirty bit for the dead data stored at the L2 cache 131 and the L1 cache 121. Clearing the dirty bit (also referred to as unsetting the modified bit) occurs at any cache level at which the data is modified. Once the dirty bit has been cleared, the cache controllers for the L1 cache 121 and the L2 cache 131 will not write back the value of the data in response to eviction of the data from the L1 cache 121 or the L2 cache 131 or in response to a flush of the L1 cache 121 or the L2 cache 131. It will be appreciated that in some embodiments the L3 cache controller 142 propagates the dead data operation through the cache hierarchy 104 of all of the processing units 101-103 to clear the dirty bit of any block of data found at the target address or address range.

Figure 3:
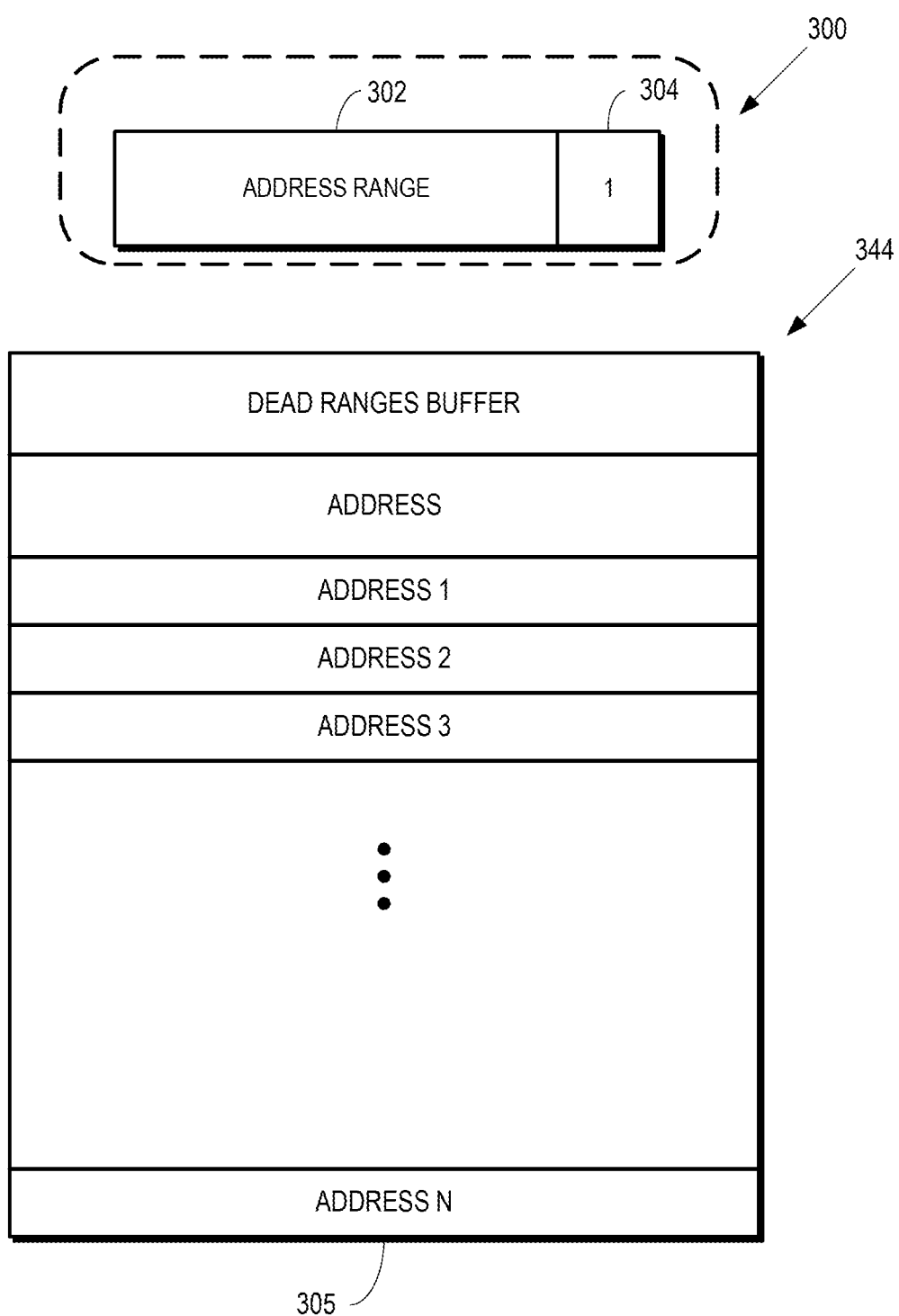
FIG. 3 is a block diagram of a dead data indication and a dead ranges buffer in accordance with some embodiments.

FIG. 3 is a block diagram of a dead data indication 300 and a dead ranges buffer 344 in accordance with some embodiments. In some embodiments a coarse-grain dead data indication may be sent as part of a last-load operation, or it may be sent as a lone dead data indicator, each of which requires a new opcode or bit of metadata 304. The dead data indication includes field 302 for storing a fine- or coarse-grain address or address range of the target dead data range. This may be used to clear dirty state in caches it encounters (this requires no new structure, apart from logic to handle this state transition), or it may be used to update a dead ranges buffer 344. Entries in the dead ranges buffer may be stored at a fixed granularity so that each range can be indexed based on the base address, they may be stored as a collection of variable-granularity address ranges such that a range-check must be performed against all entries in the buffer, or they may be stored in a hybrid of these two solutions.

The dead ranges buffer 344 includes a column 305 that includes a field for storing addresses associated with the dead address ranges. In some embodiments, dead address range entries are defined at a fixed granularity (e.g., cache line granularity or page granularity), enabling simple index lookup and insertion. In some embodiments, dead address range entries specify a custom range via a base address and length, and logic tests whether an address falls within each range on a lookup. In some embodiments, the dead ranges buffer 344 is implemented as a separate structure from the cache and is sized to track the most recent address ranges of dead data because the most recent address ranges are those ranges that are most likely to be resident in the cache hierarchy 104 and dirty. Entries of the dead ranges buffer 344 are evicted according to a replacement policy such as least recently used (LRU). It will be appreciated that early eviction of an entry from the dead ranges buffer 344 will simply result in write backs of dirty data having an address matching the entry in the event of an eviction or cache flush.

Figure 4:
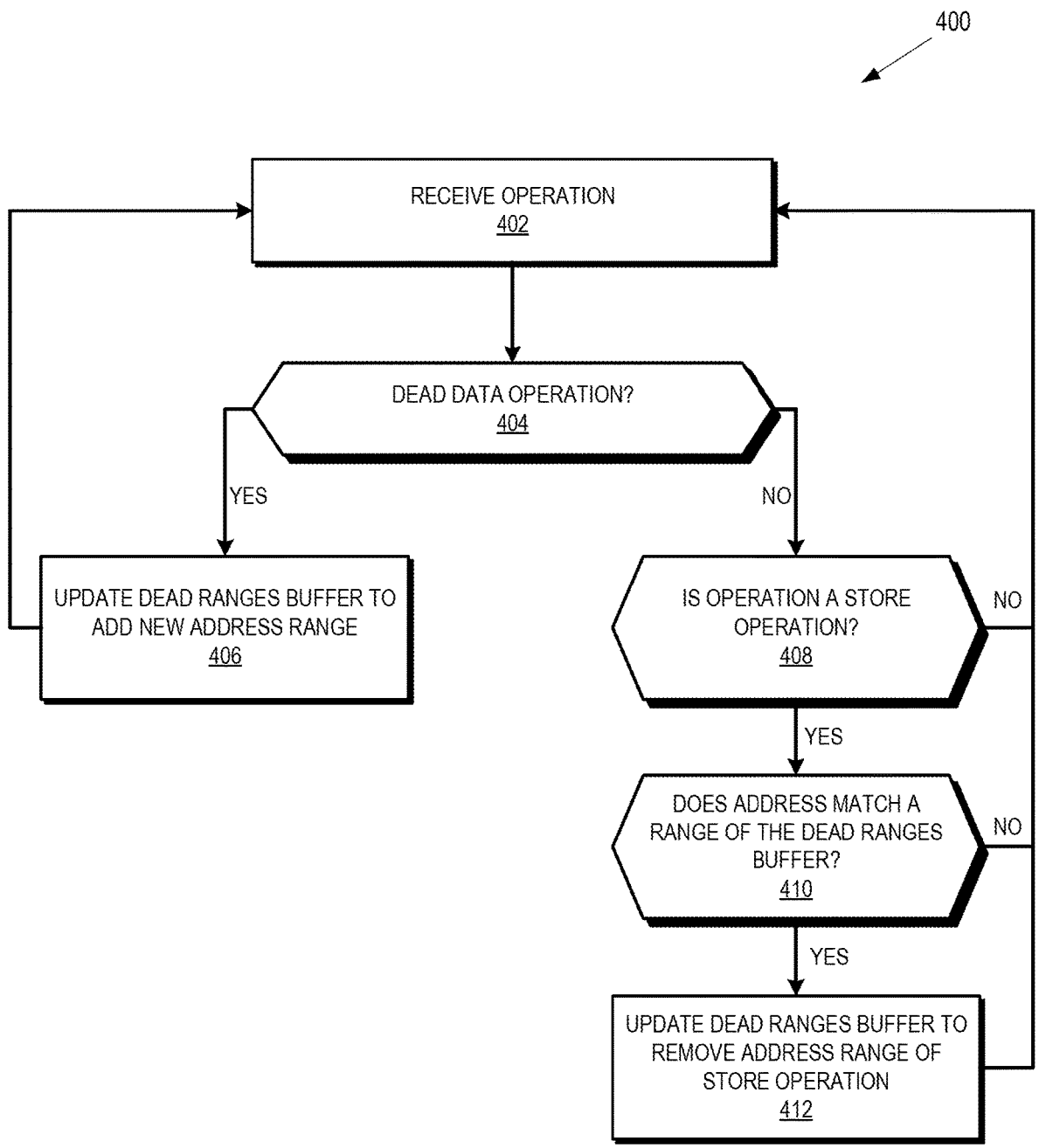
FIG. 4 is a flow diagram illustrating a method for updating a dead ranges buffer based on a "mark as dead" operation in accordance with some embodiments.

FIG. 4 is a flow diagram illustrating a method 400 for updating a dead ranges buffer based on receipt of a store operation in accordance with some embodiments. The method 400 is implemented in some embodiments of the processing system 100 shown in FIG. 1 and the dead ranges buffer 344 shown in FIG. 3.

At block 402, the L3 cache controller 142 receives an operation from the application 110. At block 404, the L3 cache controller 142 determines whether the operation is a dead data operation. If at block 404, the L3 cache controller 142 determines that the operation is a dead data operation, the method flow continues to block 406. At block 406, the L3 cache controller 142 updates the dead ranges buffer 144 to add the address or the address range of the cache line(s) targeted by the dead data operation. If the dead ranges buffer 144 is full, the L3 cache controller 142 evicts an entry from the dead ranges buffer 144 according to a replacement policy and installs the address or address range of the cache line(s) targeted by the dead data operation. The method flow then continues back to block 402.

If at block 404, the L3 cache controller 142 determines that the operation is not a dead data operation, the method flow continues to block 408. If at block 408, the L3 cache controller 142 determines that the operation is not a store operation, the method flow continues back to block 402. If at block 408, the L3 cache controller 142 determines that the operation is a store, the method flow continues to block 410. At block 410, the L3 cache controller 142 determines whether the address or address range of the cache line(s) targeted by the store operation match an address or address range of the dead ranges buffer 144. If not, the method flow continues back to block 402. If at block 410, the L3 cache controller 142 determines that the address or address range of the cache line(s) targeted by the store operation matches an address or an address range of the dead ranges buffer 144, the method flow continues to block 412. At block 412, the L3 cache controller 142 updates the dead ranges buffer 144 to remove the address or address range of the cache line(s) targeted by the store operation to prevent the data that is the subject of the store operation from being subsequently overwritten (discarded) in the event it is evicted or flushed from a cache.

Figure 5:
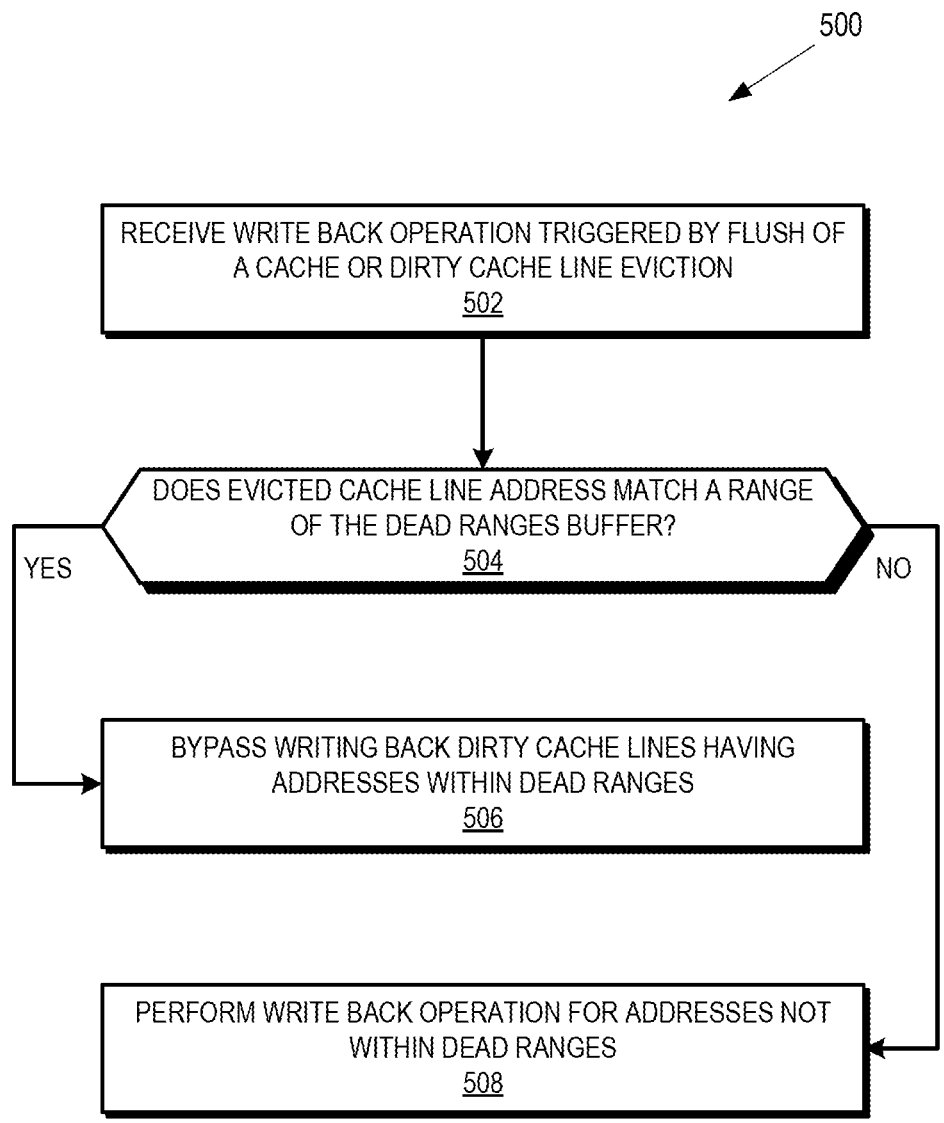
FIG. 5 is a flow diagram illustrating a method for selectively writing back dirty cache lines based on matching an address range in a dead ranges buffer in accordance with some embodiments.

FIG. 5 is a flow diagram illustrating a method 500 for selectively writing back dirty cache lines based on matching an address range in a dead ranges buffer in accordance with some embodiments. The method 500 is implemented in some embodiments of the processing system 100 shown in FIG. 1 and the dead ranges buffer 344 shown in FIG. 3.

At block 502, the L3 cache controller 142 receives a request to perform a write-back operation triggered by a flush of a cache or an eviction of a dirty cache line or block of data. At block 504, the L3 cache controller 142 determines whether the address of the evicted dirty cache line matches an address or address range stored at the dead ranges buffer 144. In the case of a cache flush, the L3 cache controller 142 determines whether the addresses of any dirty cache lines stored in the cache to be flushed match an address or address range stored at the dead ranges buffer 144. If at block 504, the L3 cache controller 142 determines that the address of the dirty cache line matches an address or address range stored at the dead ranges buffer 144, the method flow continues to block 506. At block 506, the L3 cache controller 142 (and the cache controllers associated with any other caches storing the dirty cache line) bypasses writing back the evicted dirty cache line or lines having addresses that match an address or address range stored at the dead ranges buffer 144. If at block 504, the L3 cache controller determines that the address of the dirty cache line does not match an address or address range stored at the dead ranges buffer 144, the method flow continues to block 508. At block 508, the L3 cache controller (and the cache controllers associated with any other caches storing the dirty cache line) write back the value of the dirty cache line in response to the eviction or cache flush.

Figure 6:
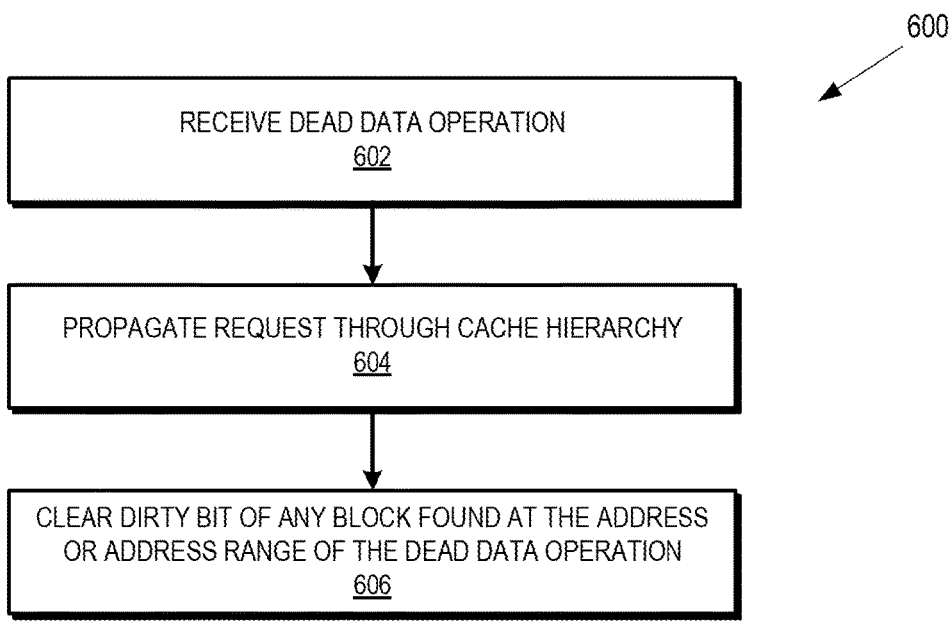
FIG. 6 is a flow diagram illustrating a method for selectively clearing dirty bits of blocks of data having an address of a last read operation in accordance with some embodiments.

FIG. 6 is a flow diagram illustrating a method 600 for selectively clearing dirty bits of blocks of data having an address of a dead data operation in accordance with some embodiments. The method 600 is implemented in some embodiments of the processing system 100 shown in FIG. 1. At block 602, the L3 cache controller 142 receives a request to perform a dead data operation for a block of data. In some embodiments, the dead data operation is paired with a standard read operation and indicates that this will be the last time the data is read until the address is written again. At block 604, the L3 cache controller 142 propagates the request through the cache hierarchy 104. At block 606, the L3 cache controller 142 clears the dirty bit for any block of data having the address or address range of the dead data operation. By clearing the dirty bit, the L3 cache controller 142 prevents the block of data from being written back in the event it is evicted from a cache or the cache in which it is stored is flushed.

Figure 7:
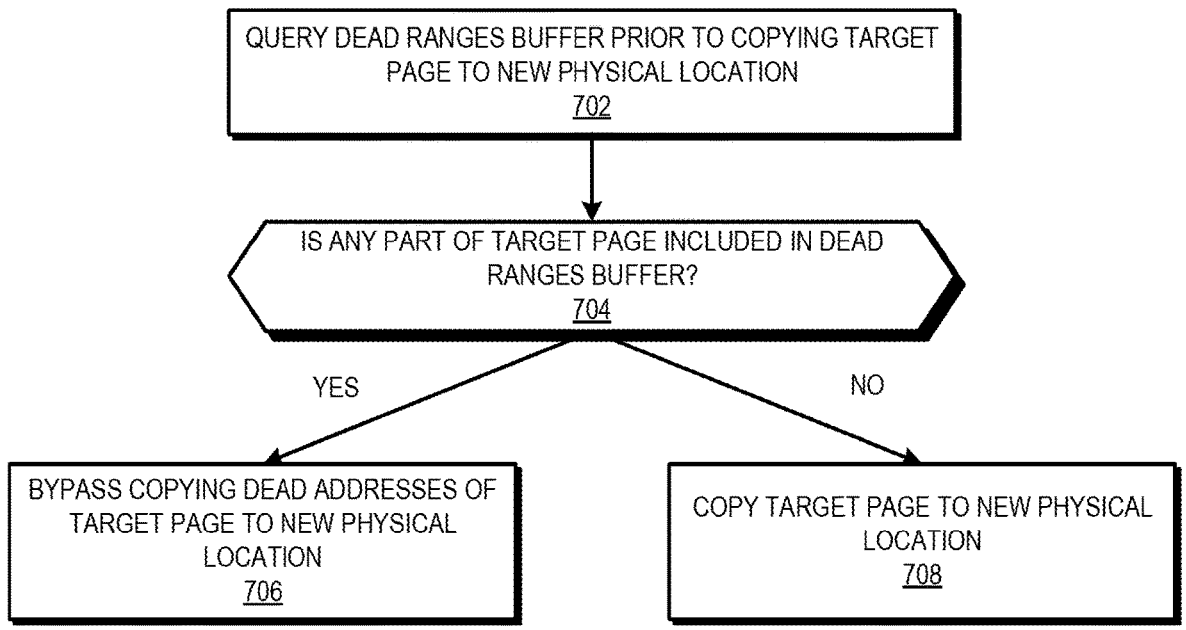
FIG. 7 is a flow diagram illustrating a method for tracking dead data to avoid copying dead data in a page migration or page replacement.

FIG. 7 is a flow diagram a method 700 for selectively performing data copies for a page migration or page replacement. Migration of a virtual page address from one physical location in memory to another is required in some cases to improve locality in a non-uniform memory access (NUMA) architecture, and involves transferring all data in a target page from a current physical location to the new physical location. Similarly, when replacing a target page in memory to make space for a new page, the old page is typically copied to a backing storage memory. However, in both cases, if the data to be copied is dead, this step can be avoided. To support this optimization, at block 702, the operating system 108 queries the dead ranges buffer 344 before performing the data copy. At block 704 the operating system 108 determines if part of the target page is included in the dead ranges buffer 344. If, at block 704, the operating system 108 determines that part of the target page is included in the dead ranges buffer 344, then that data does not need to be copied and the method flow continues to block 706. At block 706, the operating system 108 bypasses copying parts of the target page that are included in the dead ranges buffer 344, saving memory bandwidth at the old and new data locations. If, at block 704, the operating system 108 determines that no part of the target page is included in the dead ranges buffer 344, the method flow continues to block 708. At block 708, the operating system 108 copies the target page to the new physical location.

In some embodiments, the apparatus and techniques described above are implemented in a system including one or more integrated circuit (IC) devices (also referred to as integrated circuit packages or microchips), such as the processing system described above with reference to FIGS. 1-7. Electronic design automation (EDA) and computer-aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   in response to evicting a dirty cache line from a first cache of a processor, bypassing writing the dirty cache line to a second cache or memory of the processor in response to receiving an indication that the dirty cache line is dead.

2. The method of claim 1, wherein the indication is received from software executing at the processor and comprises a dead data operation indicating that a value of the dirty cache line of the first cache will not be read again or will be subsequently overwritten before being read again.

3. The method of claim 1, further comprising:
   tracking, at a buffer, address ranges corresponding to dirty cache lines that will not be subsequently read or that will be overwritten before being subsequently read.

4. The method of claim 3, further comprising:
   comparing an address corresponding to the dirty cache line to the address ranges tracked at the buffer; and
   bypassing writing the dirty cache line to the second cache or memory in response to the address corresponding to the dirty cache line being included in the address ranges.

5. The method of claim 3, further comprising:
   clearing a dirty bit associated with an address range corresponding to a dirty cache line that will not be subsequently read.

6. The method of claim 3, further comprising:
   querying the buffer prior to copying a page of data to a new physical location; and
   bypassing copying a portion of the page of data to the new physical location in response to determining that the portion includes an address tracked at the buffer.

7. A method comprising:
   receiving, at a cache controller for a first cache of a processor, the first cache storing a plurality of dirty cache lines, an indication that a subset of the dirty cache lines are dead; and
   in response to a flush operation or eviction of a dirty cache line from the first cache, selectively writing back only the dirty cache lines not included in the subset of the dirty cache lines to a second cache.

8. The method of claim 7, wherein the indication comprises a dead data operation indicating that values of the subset of the dirty cache lines will not be subsequently read or will be overwritten before being subsequently read.

9. The method of claim 8, further comprising:
   tracking, at a buffer, address ranges corresponding to dirty cache lines that will not be subsequently read or that will be overwritten before being subsequently read.

10. The method of claim 9, further comprising:
    comparing an address corresponding to a dirty cache line to the address ranges tracked at the buffer; and
    bypassing writing the dirty cache line to the second cache in response to the address corresponding to the dirty cache line being included in the address ranges.

11. The method of claim 9, further comprising:
    clearing a dirty bit associated with an address range corresponding to a dirty cache line that will not be subsequently read.

12. The method of claim 9, further comprising:
    querying the buffer prior to copying a page of data to a new physical location; and
    bypassing copying a portion of the page of data to the new physical location in response to determining that the portion includes an address tracked at the buffer.

13. A processor comprising:
    a first cache configured to store dirty cache lines;
    a second cache; and
    a cache controller associated with the first cache, the cache controller to:
    receive an indication that a dirty cache line is dead; and
    in response to a flush operation or eviction of dirty cache lines from the first cache, bypass writing back the dirty cache line to the second cache based on the indication.

14. The processor of claim 13, wherein the indication comprises a dead data operation indicating that a value of the dirty cache line will not be subsequently read or will be overwritten before being subsequently read.

15. The processor of claim 13, wherein the cache controller is further to:
in response to a new store operation for the dirty cache line, indicate the dirty cache line is no longer dead.

16. The processor of claim 13, further comprising:
a buffer, wherein the cache controller is further to:
track, at the buffer, address ranges corresponding to dirty cache lines that will not be subsequently read or will be overwritten before they are subsequently read.

17. The processor of claim 16, wherein the cache controller is further to:
compare an address corresponding to the dirty cache line to the address ranges tracked at the buffer; and
bypass writing the dirty cache line to the second cache in response to the address corresponding to the dirty cache line being included in the address ranges.

18. The processor of claim 16, wherein the cache controller is further to:
modify the address ranges to remove a tracked address in response to receiving a store operation indicating that data stored at the tracked address has been overwritten.

19. The processor of claim 16, further comprising:
an operating system to:
query the buffer prior to copying a page of data to a new physical location; and
bypass copying a portion of the page of data to the new physical location in response to determining that the portion includes an address tracked at the buffer.

20. The processor of claim 13, wherein the cache controller is further to:
clear a dirty bit associated with an address range corresponding to a dirty cache line that is dead.

* * * * *